(12) United States Patent
Reimers

(10) Patent No.: US 12,291,676 B2
(45) Date of Patent: May 6, 2025

(54) PROCESS FOR MELTING PLASTIC FOR SUBSEQUENT FEEDING TO A PROCESSOR VIA A MELT PUMP

(71) Applicant: ExxonMobil Chemical Patents Inc., Baytown, TX (US)

(72) Inventor: Jay L. Reimers, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 184 days.

(21) Appl. No.: 17/776,275

(22) PCT Filed: Nov. 2, 2020

(86) PCT No.: PCT/US2020/058511
§ 371 (c)(1),
(2) Date: May 12, 2022

(87) PCT Pub. No.: WO2021/096716
PCT Pub. Date: May 20, 2021

(65) Prior Publication Data
US 2022/0389327 A1 Dec. 8, 2022

Related U.S. Application Data

(60) Provisional application No. 62/935,277, filed on Nov. 14, 2019.

(30) Foreign Application Priority Data

Jan. 28, 2020 (EP) .................................... 20154067

(51) Int. Cl.
*C10B 53/07* (2006.01)
*B09B 3/40* (2022.01)
(Continued)

(52) U.S. Cl.
CPC ................ *C10B 53/07* (2013.01); *B09B 3/40* (2022.01); *B29B 17/04* (2013.01); *C10B 47/16* (2013.01);
(Continued)

(58) Field of Classification Search
CPC ...................................................... C10B 53/07
See application file for complete search history.

(56) References Cited

U.S. PATENT DOCUMENTS 5,129,995 A * 7/1992 Agarwal ................... C10B 7/10
75/403
5,198,018 A * 3/1993 Agarwal ................... C10B 7/10
75/401
(Continued)

FOREIGN PATENT DOCUMENTS

CN 107738378 A 2/2018
CN 108285800 A 7/2018
(Continued)

OTHER PUBLICATIONS

Espacenet translation of JP H0841465 A.*
(Continued)

*Primary Examiner* — Jonathan Luke Pilcher

(57) ABSTRACT

Process for feeding plastic material, e.g. a plastic waste, to a processor such as a thermochemical reactor, e.g. a pyrolysis reactor. The process comprises an optional shredder or disintegrator (1), a conveying system (2), a feed hopper (3) with a lock hopper or rotary valve, a melting tank (6) with an agitator (5) followed by a melt pump (7) for the delivery of molten plastic to the processor. The advantage of the current process includes the ability to supply a consistent, metered flow to the processor, independent of the recycled plastic's melt properties, or the form or particle size and distribution of the plastic material.

24 Claims, 1 Drawing Sheet

(51) Int. Cl.
*B29B 17/04* (2006.01)
*C10B 47/16* (2006.01)
*C10G 1/10* (2006.01)
*B09B 101/75* (2022.01)

(52) U.S. Cl.
CPC ............ *C10G 1/10* (2013.01); *B09B 2101/75* (2022.01); *B29B 2017/0496* (2013.01); *C10G 2300/1003* (2013.01)

(56) References Cited

U.S. PATENT DOCUMENTS

| | | | | |
|---|---|---|---|---|
| 5,316,734 | A * | 5/1994 | Yamaguchi | B01J 6/008 366/144 |
| 5,728,361 | A * | 3/1998 | Holley | C10B 53/07 423/449.6 |
| 6,011,187 | A * | 1/2000 | Horizoe | B29B 17/02 201/2.5 |
| 6,346,220 | B1 * | 2/2002 | Kosugi | C10L 9/02 110/255 |
| 9,624,439 | B2 * | 4/2017 | Bakaya | C10B 47/48 |
| 9,920,251 | B2 * | 3/2018 | Karanikas | B29B 17/04 |
| 10,544,936 | B1 * | 1/2020 | Da Igreja | C10B 53/07 |
| 10,551,059 | B2 * | 2/2020 | Inskip | F27D 7/02 |
| 2003/0047437 | A1 | 3/2003 | Stankevitch | |
| 2014/0121426 | A1 * | 5/2014 | Tandon | C10G 1/10 422/187 |
| 2014/0262728 | A1 * | 9/2014 | Karanikas | C10B 53/07 202/105 |
| 2015/0001061 | A1 * | 1/2015 | Bordynuik | C10L 1/06 202/112 |
| 2015/0080624 | A1 | 3/2015 | Gephart et al. | |
| 2016/0040073 | A1 * | 2/2016 | Bakaya | B01J 19/28 422/187 |
| 2017/0336070 | A1 * | 11/2017 | Inskip | F27D 17/008 |
| 2019/0275486 | A1 | 9/2019 | Peltekis et al. | |
| 2022/0363994 | A1 * | 11/2022 | Besong | B01J 6/008 |

FOREIGN PATENT DOCUMENTS

| | | | | |
|---|---|---|---|---|
| EP | 0662503 | A1 | 7/1995 | |
| JP | H05279673 | A * | 10/1993 | |
| JP | H06128569 | A | 5/1994 | |
| JP | H0841465 | A * | 2/1996 | |
| JP | H0872058 | A | 3/1996 | |
| JP | H08334221 | A | 12/1996 | |
| KR | 20090028173 | A * | 3/2009 | ............ C10B 53/07 |
| WO | WO-2009087080 | A2 * | 7/2009 | ............ B09B 3/00 |
| WO | WO 2017/003802 | A1 | 1/2017 | |

OTHER PUBLICATIONS

Espacenet translation of JP H05279673A.*
Espacenet translation of WO 2009087080.*
Espacenet translation of KR-20090028173-A.*
Jianjun Dai et al., "Biomass feeding for thermochemical reactor", Progress in Energy and Combustion Science, 38, (2012) 716-736.

* cited by examiner

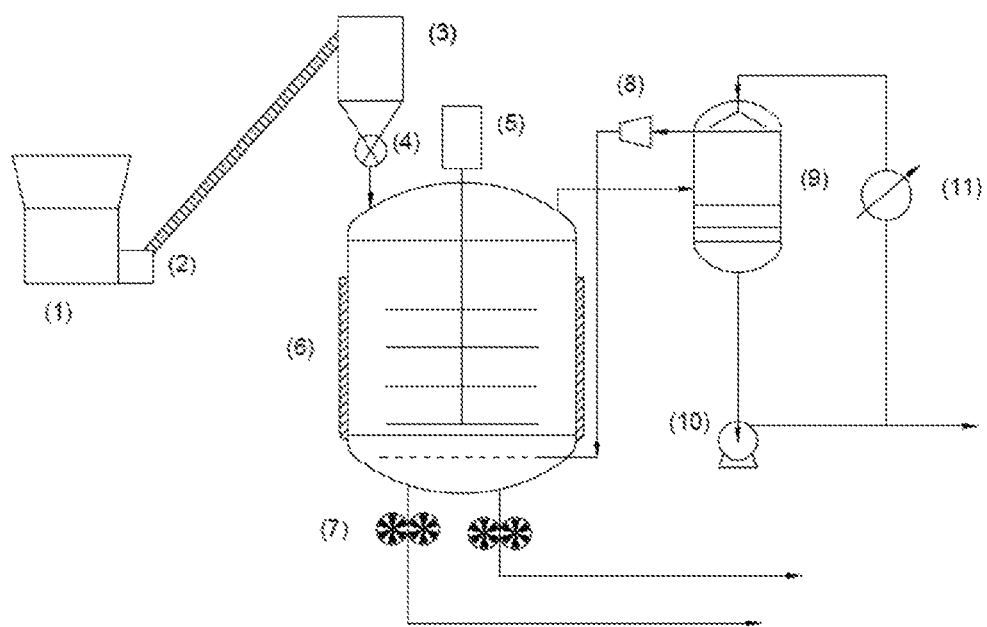

ies in screw fill, product form, and product properties like

PROCESS FOR MELTING PLASTIC FOR SUBSEQUENT FEEDING TO A PROCESSOR VIA A MELT PUMP

CROSS-REFERENCE TO RELATED APPLICATIONS

This application is a National Phase application claiming priority to PCT application Serial No. PCT/US2020/058511, filed Nov. 2, 2020, which claims the priority benefit of U.S. Ser. No. 62/935,277, filed Nov. 14, 2019, and EP 20154067.1, filed Jan. 28, 2020, which are incorporated herein by reference.

FIELD

This disclosure relates to processes for feeding plastic material to a processor in a continuous manner. In particular, this disclosure relates to processes for feeding plastic waste to a thermochemical reactor such as a pyrolysis reactor. This disclosure is useful, e.g., in converting plastic waste into useful chemical and/or fuel products.

BACKGROUND

Plastic waste recycling has become a method for reducing the amount of waste sent to landfills. The reuse of plastic waste reduces the demand on landfills. Plastic waste recycling also reduces the demand on fossil-based plastics thereby reducing greenhouse gas emissions. Greenhouse emissions are gases (such as carbon dioxide or methane) that absorb infrared radiation, trap heat in the atmosphere, and contribute to the greenhouse effect. Thus, plastic waste recycling provides an additional source of plastic feedstocks made from fossil-based resources. One method for recycling polypropylene for use as plastic feedstock is disclosed in WO 2017/003802.

Conventional means of conveying waste, for example biomass, to a processor such as a reactor, e.g., a pyrolysis reactor, include the use of rotary equipment such as screw conveyors, rotatory conveyors, and star feeders, piston feeders, or the use of hoppers or lock-hoppers. The limitation of these technologies as applied to plastics waste recycling is the inability to deliver a consistent feed rate, due to either the variety of forms in which plastic is recycled (e.g. film, particles, or chunks), the cohesiveness or adhesiveness of the waste, or the waste size and distribution which can lead to bridging or ratholing in the feed system. Ratholing occurs when materials are compacted on the sidewalls of a feeder system thereby severely restricting material flow.

Inconsistent feed rates in a feed system are detrimental for a number of reasons. Surges in the feed rate create unnecessary wear on moving parts such as motors and drives. In the case of screw and piston feeders, inconsistent or variable feed rates make it difficult to maintain the plug at the end of the discharge which is the only means of isolating the reactor from the feed section and preventing the backflow of gases. Lastly, the performance of the pyrolysis reactor is dependent on the liquid residence time, and variations of more than +/−10% in the feed flow rate will negatively impact the ability to control the reactor. A review the problems found in organic biomass feeding into reactors may be found at "Biomass feeding for thermochemical reactor", *Progress in Energy and Combustion Science,* 38, (2012) 716-736.

SUMMARY

Disclosed is a process for feeding plastic material (e.g., plastic waste) into a processor (e.g., a thermochemical reactor such as a pyrolysis reactor) comprising the steps of: a) conveying the plastic material into a feed hopper via a screw conveyor or an air conveyor; b) supplying a controlled amount of the plastic material into a melting tank via a control mechanism; c) melting the plastic waste in the melting tank at a temperature from about 200 to about 300° C. using a melt pump and a melting tank agitator; and d) supplying a controlled amount of the molten plastic material into a processor in a controlled metered flow.

BRIEF DESCRIPTION OF THE FIGURE

For a better understanding of the nature, objects, and processes involved in this disclosure, reference should be made to the detailed description taken in conjunction with the accompanying FIGURE.

The FIGURE provides a schematic of the apparatus of this disclosure.

DETAILED DESCRIPTION

Typically plastic material (e.g., plastic waste) is recycled by mechanical recycling. Mechanical recycling of plastic waste refers to the processing of plastic waste without changing the chemical structure of the material. Plastic materials may also be processed by chemical recycling. In such a process, the chemical structure of the plastic material is changed and converted into different materials in a chemical processor (e.g., a thermochemical reactor such as a pyrolysis reactor). For example, chemical recycling processes, such as pyrolysis, can break down plastic material to produce various gases and liquid products.

Conventional means of conveying plastic material to a processor include the use of rotary equipment such as screw conveyors, rotatory conveyors, and star feeders, piston feeders, or the use hoppers or lock-hoppers. The limitation of these technologies when applied to plastics waste is the inability to deliver a consistent feed rate, due to either the variety of forms in which plastic is recycled (e.g. film, particles, or chunks), the cohesiveness or adhesiveness of the waste, or the waste size and distribution which can lead to bridging or rat-holing in the feed system.

A technical problem in the prior art is the feeding of plastic material into a reactor without interruption and in a controlled manner. Inconsistent feed rates are detrimental for a number of reasons. Surges in the feed rate create unnecessary wear on moving parts such as motors and drives. In the case of screw and piston feeders, inconsistent or variable feed rates make it difficult to maintain the plug at the end of the discharge which is the only means of isolating the reactor from the feed section and preventing the backflow of gases. Lastly, the performance of the processor is dependent on the liquid residence time, and variations of more than +/−10% in the feed flow rate will negatively impact the ability to control the reactor.

This disclosure addresses these problems of inconsistent material flow by supplying a controlled amount of the plastic material in molten form. The inventive process provides the ability to supply a consistent, metered flow to the processor, independent of the recycled plastic's melt properties, or the form or particle size and distribution of the plastic material.

Melting the plastic material can be achieved by using mechanical energy (e.g. an extruder) or thermal energy (heated tank). Much like a screw conveyor, an extruder would be prone to surging and excessive wear with variamelt flow rate or solution viscosity. Hence, a melting tank option is proposed and preferred in this disclosure.

With reference to the FIGURE, the shredder/chopper (1) is used to size the mixed plastic material for conveying. The conveyor (2) is used to deliver the mixed plastic material to the feed hopper. The feed hopper (3) is used to feed the melting tank. The control mechanism (4) is used to meter the plastic material to the melting tank. The melting tank agitator (5) provides agitation for the melting tank. The jacketed melting tank (6) melts the polymer and may at partially decompose the plastics. As the plastic material is melted in a melting tank, a gas mixture may be generated or produced. Examples of chemical species in the gas mixture include but are not limited to hydrogen chloride (HCl) from the decomposition of polyvinyl chloride (PVC), carbon monoxide (CO) and carbon dioxide ($CO_2$) gases from the decomposition of polyethylene terephthalate (PET) and hydrogen cyanide (HCN) and ammonia ($NH_3$) from the decomposition of nylon (polyamide).

With reference to the FIGURE, the one or more melt pump(s) (7) meter the waste plastic molten melt to the processor (e.g., a thermochemical reactor, preferably a pyrolysis reactor) at a high discharge pressure. The melt pump(s) (7) also control the level in the melting tank. The compressor (8) compresses light gases not stripped out of the scrubber (9), and sends them back to the melting tank (6). The scrubber (9) is a contact condenser, which scrubs out the acid gases and/or other water soluble gases. The recirculation pump (10) recirculates water through the cooler and back into the scrubber (9) and on to waste water treatment. The recirculated liquid is cooled through a cooler or an exchanger (11) and then the cooled liquid both condenses hydrocarbon gases and scrubs out water-soluble gases (e.g. HCl, $CO_2$, HCN) in the vessel.

The FIGURE illustrates an exemplary plastic material processing system. In an exemplary embodiment, the plastic material recycling apparatus consists of the following unit elements:
a) optionally, a shredder (1) that would reduce the mixed plastic material to a manageable size for screw conveying;
b) a screw or air conveyer (2) that would carry the chips/pellets from the shredder to a hopper that will feed the melting tank;
c) a feed hopper (3) with a control mechanism (4) that would meter the amount of waste plastic sent to the melting tank (6), and provides some surge capacity;
d) an agitated melting tank (5) and (6) with heating coils and a jacket that runs between about 200° C. and about 300° C. and less than 150 psig;
e) optionally, pyrolysis oil or other diluent that would control the melt viscosity;
f) a liquid contactor/condenser (9) wherein vapors from the melting tank (nitrogen, light hydrocarbons, and acid gases) can be sent;
g) a cooler (11) that would remove the small amount of heat brought by the hot gases from the melting tank; and
h) melt pump(s) (7) that would meter the feed to the processor.

As used herein, the term "plastic waste" includes but is not limited to post-consumer packaging waste. Post-consumer packaging waste is waste that a consumer typically discards, such as materials containing polyolefins or polyolefin blends, advertising materials, plastic bottles (plastic waste containing PET) and packaging films (plastic waste containing polyamide).

Consumer plastic material may have the following recycling symbols marked on them. The numerical symbols have a triangle surrounding the number. A 1 inside the triangle indicates the plastic is polyethylene terephthalate (PET). A 2 inside the triangle indicates the plastic is high-density polyethylene (HDPE). A 3 inside the triangle indicates the plastic is vinyl or polyvinyl chloride. A 4 inside the triangle indicates the plastic is low-density polyethylene (LDPE). A 5 inside the triangle indicates the plastic is polypropylene (PP). A 6 inside the triangle indicates the plastic is polystyrene (PS). Any plastic that does not fall under one of those six types has a 7 inside the triangle. These plastics, with a 7 inside the triangle, include nylon and polycarbonate and are found in certain food containers, signs and displays, computers and electronic devices, DVDs, sunglasses, and bulletproof materials.

In one embodiment, the plastic material includes materials containing polyolefins, polyolefin blends or mixtures thereof. Examples of polyolefins and polyolefin blends are high-density polyethylene (HDPE), linear low-density polyethylene (LLDPE), low-density polyethylene (LDPE), polyethylene (PE) and polypropylene (PP).

In one embodiment, the plastic material is selected from the group consisting of high-density polyethylene (HDPE), low-density polyethylene (LDPE), polyethylene (PE), polyethylene terephthalate (PET), polypropylene (PP), polystyrene (PS) and mixtures thereof. In another embodiment, the plastic material is substantially high-density polyethylene (HDPE), linear low-density polyethylene (LLDPE), low-density polyethylene (LDPE), polyethylene (PE) or a mixture thereof.

In another embodiment, the waste plastic does not contain more than 10 percent polyethylene terephthalate and/or polyamide.

In another embodiment, the plastic material may include polyvinyl chloride (PVC) or polyvinylidenechloride (PVDC). PVDC is used, for example, in blister packaging. In a further embodiment, the plastic material does not include more than 10 percent PVC or PVDC. In a further embodiment, the plastic material does not include more than about 5 percent PVC or PVDC. In a further embodiment, the plastic material is no more than about two percent PVC or PVDC.

In another embodiment, the plastic material may include no more than ten percent of a condensation polymer. In a further embodiment, the plastic material does not include more 5 percent of a condensation polymer. In a further embodiment, the plastic material is no more than about two percent condensation polymer. In a further embodiment, the plastic material does not include or contain a condensation polymer. In another embodiment, the condensation polymer is a polyester or a polyamide. In another embodiment, the condensation polymer is polyethylene terephthalate, polyamide or polyurethane.

In another embodiment, the plastic material does not include multilayer films or composites. In another embodiment, the plastic material does not include compounded waste such as rubber tires. Such undesirable plastic material may be mechanically sorted from the feed stream with near infrared spectroscopy (NIR), laser or x-ray technologies. For example, in NIR sorting, the plastic material may be spread out on a conveyer belt and identified with a NIR sensor. As certain undesirable materials are identified with their polymer signature by the NIR sensor, a burst of air from an air nozzle can separate the undesirable plastic material from the feed stream.

Other undesirable materials are contaminants to the plastic material such as stones, tires, metals and other non-combustible hard materials. Preferably, these contaminants should be removed from the plastic material feed stream as they can cause wear to the feed system or even blockage of the feed system. As with undesirable plastic material, these contaminants can be removed by mechanical means. Ferrous metals can be removed by a magnet. Stones and dirt can be removed by a mechanical means known in the art.

Unexpectedly, this disclosure is independent of a plastic's melt properties. This disclosure is not limited to any one type of polymer or broad group of polymers. However, to optimize the melting of the plastic material, depending on the type of polymers in the waste, there may be separate work flows for different polymers. For example, the condensation polymers PET and nylon are mechanically recycled and are removed from the plastic material prior to pyrolysis. In another example, because PVC generates HCl at pyrolysis, PVC is preferably removed from the plastic material. However, a small presence of PVC in the plastic material is acceptable.

The polymer material may take the physical form of one or more of chips, pellets, and/or beads, and the like.

Shredder

The shredder/chopper of the FIGURE is used to size the mixed plastic material for conveying to the feed hopper. Once sorted, the plastic may be shredded into chips of suitable sizes, e.g., about 2 inches. A consistent material size increases the efficiency and flow of the plastic material into the hopper. This shredding process is optional if processed/pelletized post-consumer or post-industrial waste is used.

Plastic Material Feed Stream on a Screw or Air Conveyer

The plastic material feedstock is carried via a screw conveyor or an air conveyer to a hopper that feeds the plastic material feedstock to the melting tank. A screw conveyer is a mechanism that uses a rotating helical screw blade to move the shredded or pelletized material to the hopper. An air conveyer is a device that uses air to move products and materials rather than mechanical belts or chains. An example of plastic material that can be moved by an air conveyer is a plastic bottle. In one embodiment, the plastic material is transferred to the feed hopper via a screw conveyer, an air conveyer or a combination of the two conveyers.

Feed Hopper with Control Mechanism

A feed hopper with a control mechanism allows for the supply of a controlled amount (i.e., metering) of plastic material sent to the melting tank. In one embodiment, the feed hopper has a conical or a wedge shape. The control mechanism meters or controls the feed rate of the plastic material to the melting tank. In one embodiment, the control mechanism comprises a rotary valve. The rotary valve also provides a seal against the backflow of gases from the melting tank. The rotary valve provides some surge capacity in addition to metering capability. The rotary valve may also be replaced or include a double-flap valve or lock-hopper. The double-flap valve or lock-hopper may also meter plastic material flow to the melting tank. In one embodiment, the control mechanism after the feed hopper in the plastic material feed system is a rotary valve, a double-flap valve, lock-hopper or a combination thereof.

When the control mechanism comprises a lock hopper, in one embodiment, the lock hopper system has a means to purge air from the solid plastic material before it is introduced to the melting tank. One way to purge air from the lock hopper system is by injecting inert gases at a pressure higher than the operating pressure of the system. In a further embodiment, the lock hopper pressure operates at a pressure slightly above the operating pressure of the melting tank to prevent the reverse flow of hot gases from the melting tank.

Melting Tank

The melting tank can be fed by any plastic in any form, provided that it melts at or below the operating temperature of the melting tank. The melting point of PET is 255° C. The melting point of polypropylene is 170° C. The melting point of polyethylene is 120 to 180° C. The melting point of HDPE is 120 to 130° C. The melting point of LLDPE is 122° C. The melting point of LDPE is 105 to 115° C. The melting point of polystyrene is 100 to 120° C. The melting point of polyvinyl chloride is 75° C. In one embodiment, the melting tank operates between about 200° C. and about 300° C. and less than 150 psig.

In another embodiment, the melting tank operates between about 200° C. and about 250° C. In a further embodiment, when the melting tank operates between about 200° C. and about 250° C., the plastic material does not include PET.

The melting tank is an agitated tank with heating coils and a jacket. The jacketed melting tank melts and decomposes the plastic material. The decomposition of the plastic material may evolve acid gases, such as in the decomposition of PVC and PVDC. In one embodiment, the heat to the melting tank is provided by heating coils within the melting tank vessel. In addition to the heating coils, heating can also be supplied by waste heat from the processor.

In another embodiment, the plastic material is melted by direct heating in the melt talk using superheated steam. The superheated steam may be generated from waste heat from the processor.

In another embodiment, the agitator in the melting tank is a mechanical mixer used to mix the contents of the melting tank. In a further embodiment, the melting tank does not contain a extruder.

As the plastic material is melted in a melting tank, polymers with hetero atoms are broken down into smaller molecules. For example, as polyvinyl chloride (PVC) is cracked, hydrogen chloride (HCl) acid gas is generated. As polyethylene terephthalate (PET) is cracked, carbon monoxide (CO) and carbon dioxide ($CO_2$) gases are generated. Lastly, as nylon (polyamide) is cracked, cyanide gas (HCN) and ammonia ($NH_3$) gases are generated. These gases have to be removed before pyrolysis oil may be added to the melting tank. In one embodiment, the gases are removed from the melting tank by sending the gases to a contact condenser.

In another embodiment, in addition to the molten plastic, the melting tank may optionally contain pyrolysis oil or another diluent to control the melt viscosity. In another embodiment, the melt viscosity of the molten flow controlled by the melt pump(s) is less than 20 MM centipoise (cP) and more than 1000 cP. For example, if the molten waste is primarily LLDPE, the melt viscosity would be around 10 MM cP. In such a case, pyrolysis oil or another diluent to reduce the melt viscosity may not be needed.

Liquid Contactor/Condenser

Vapors from the melting tank (nitrogen, light hydrocarbons, and acid gases) can be sent to a contact condenser where a water spray is used to cool the gas and strip out acid gases. The stripped gases will be recycled back to the melting tank using a small blower with a small purge to flare. The liquid level of the condenser and interface will be controlled by a capacitance probe. The hydrocarbon layer may be sent back to the melting tank while the aqueous layer may be pumped through a cooler and sent back to the condenser with a small purge to waste water treatment. As needed, pH adjustment may be necessary.

Melt Pump(s)

In certain embodiments, the melt pumps are preferably each designed for 100% capacity and will meter the molten feed to the processor at a high discharge pressure. The melt pumps meter the feed to the processor in a controlled metered flow. As used herein, the term "controlled metered flow" means a flow rate controlled as required by the inventive process. In one embodiment, the molten flow is about 25,000 pounds per hour (metered) of molten polymer, plus or minus 2,500 pounds per hour (controlled).

In another embodiment, the melt viscosity of the molten flow controlled by the melt pump(s) is less than 20 MM centipoise (cP) and more than 1000 cP. The pressure drop, measured in the transfer lines, may also be used to infer viscosity of the molten plastic material.

In preferred embodiments where the melt pump(s) are positive displacement pumps, they provide a consistent metered flow of molten plastic to the processor. In one embodiment, the melt pump(s) maintain a liquid seal between the processor and the melting tank. The melt pump(s) are capable of pumping up to and against very high pressures, ensuring that there is a liquid seal between the processor and the melting tank. This prevents the backfeeding of gases back to the melting tank.

In another embodiment, the melt pump(s) are screw or gear positive displacement pump(s). Screw pump(s) are a special type of rotary positive displacement pump in which the liquid is carried between screw threads on two or more rotors and is displaced axially as the screws rotate and mesh. Gear pump(s) have gears that create voids as they come out of mesh and liquid flows into the pump. As the gears come back into mesh, volumes are reduced and liquid is forced out the discharge port. In a further embodiment, the melt pump(s) are screw pump(s).

In another embodiment, the molten flow may contain some level of undissolved solids as long as the overall viscosity of the molten flow is less than 20 MM cP and more than 1000 cP. The solids can be organic or inorganic soft materials. In a further embodiment, the solid content of the molten flow is less than 30% wt/wt as the solid material would have to fit in the screw cavity or gear cavity of the screw or gear positive displacement melt pumps. In a further embodiment, the size of the solids is less than 4 cm. Preferably, the size of the solids is less than 2 cm.

In another embodiment, the melt pump(s) control the molten plastic level in the melting tank.

Compressor

The compressor compresses light gases not stripped out of the scrubber or condenser and sends them back to the melting tank.

Recirculation Pump

The recirculation pump recirculates water through the cooler and back into the scrubber and on to waste water treatment (WWT).

The Cooler

The cooler controls the temperature of the scrubber or condenser. The cooler removes the small amount of heat brought by the hot gases from the melting tank.

This disclosure may further include one or more of the following non-limiting embodiments:

E1. A process for feeding a plastic material into a processor comprising the steps of:
  a) conveying the plastic material into a feed hopper via a screw conveyor or an air conveyor;
  b) supplying a controlled amount of the plastic material into a melting tank via a control mechanism;
  c) melting the plastic material in the melting tank at a temperature from about 200 to about 300° C. using a melt pump and a melting tank agitator;
  d) supplying the molten plastic material into a processor in a controlled metered flow.

E2. The process of E1, wherein the plastic material are in the form of chips, pellets, and/or beads.

E3. The process of E1 or E2, wherein the melting tank does not include an extruder.

E4. The process of any of E1 to E3, wherein the control mechanism between the feed hopper and the melting tank comprises a rotary valve.

E5. The process of any of E1 to E4, wherein a rotary valve controls the quantity of the plastic material supplied into the melting tank.

E6. The process of any of E1 to E5, wherein the rotary valve provides a seal against a backflow of gas from the melting tank.

E7. The process of any of E1 to E6, wherein the control mechanism comprises a double-flap valve.

E8. The process of any of E1 to E7, wherein the control mechanism comprises a lock-hopper.

E9. The process of any of E1 to E8, wherein the temperature in step c) is about 200 to about 250° C.

E10. The process of any of E1 to E9, wherein the pressure of the melting tank is less than 1,034 kilopascal-gauge (150 psig).

E11. The process of any of E1 to E10, wherein the melting tank is partially heated by waste heat from the processor.

E12. The process of any of E1 to E11, wherein the melting tank contains a pyrolysis oil.

E13. The process of any or E1 to E12, wherein the melting tank contains a diluent to control melt viscosity.

E14. The process of any or E1 to E13, wherein the process of melting the plastic material produces a gas mixture from the melting tank.

E1S. The process of E14, wherein the gas mixture from the melting tank comprises nitrogen, hydrocarbons, an acid gas, or a combination thereof.

E16. The process of E14 or E15, wherein the gas mixture of the melting tank is sent to a contact condenser to eliminate the acid gas.

E17. The process of E16, wherein the contact condenser includes a water spray which cools the gas mixture produced in the melting tank.

E18. The process of any or E15 to E17, wherein the hydrocarbon gas is sent back to the melting tank.

E19. The process of any or E1 to E18, wherein the melt pump meters the feed of the molten plastic to the processor.

E20. The process of any of E1 to E19, wherein the melt pump maintains a liquid seal between the processor and the melting tank.

E21. The process of any of E1 to E20, wherein the melt pump is a screw or gear positive displacement pump.

E22. The process of any or E1 to E21, wherein the mixed plastic material does not contain a condensation polymer.

E23. The process of E22, wherein the condensation polymer is a polyethylene terephthalate, a polyamide or a polyurethane.

E24. The process of any or E1 to E23, wherein the plastic material does not contain compounded waste.

E25. The process of any of E1 to E24, wherein the plastic material is a polyolefin, a polyolefin blend, or a mixture thereof.

E26. The process of any or E1 to E25, wherein the melting tank agitator is a mechanical mixer used to mix the contents of the melting tank.

E27. The process of any of E1 to E26, wherein heat to the melting tank is provided by heating coils within the melting tank vessel.

E28. The process of any or E1 to E27, wherein the waste plastic is introduced through a lock hopper system that purges air from the solid plastic material before it is introduced to the melting tank.

E29. The process of any of E1 to E28, wherein the plastic material is melted by direct heating in a melt talk using superheated steam.

E30. The process of any of E1 to E29, wherein the plastic material comprises a plastic material.

The various descriptive elements and numerical ranges disclosed herein, the reactants used to make the master batch formulations as disclosed herein, and their use in the preparation elastomeric compositions can be combined with other descriptive elements and numerical ranges to describe the invention(s); further, for a given element, any upper numerical limit can be combined with any lower numerical limit described herein. The features of the invention are described in the following non-limiting examples.

In the specification and in the claims, the terms "including" and "comprising" are open-ended terms and should be interpreted to mean "including, but not limited to". These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

What is claimed is:

1. A process comprising:
   conveying a quantity of plastic material into a feed hopper via a screw conveyor or an air conveyor;
   supplying a controlled amount of the plastic material directly into a melting tank from the feed hopper using a rotary valve control mechanism, wherein the rotary valve control mechanism forms a gas seal between the feed hopper and the melting tank, wherein the rotary valve provides a seal against a backflow of a gas from the melting tank, and wherein the rotary valve controls the quantity of the plastic material supplied into the melting tank;
   melting the plastic material in the melting tank at a temperature from 200° C. to 300° C. while agitating the plastic material using a melting tank agitator to form a molten plastic material and a gas mixture;
   supplying the gas mixture to a condenser, wherein the gas mixture is contacted by a recirculated liquid in the condenser that strips out acid gases and other water-soluble gases, and wherein other gases not stripped out are compressed and at least partially sent back to the melting tank;
   withdrawing the molten plastic material using a melt pump fluidically connected to the melt tank; and
   supplying the molten plastic material into a processor in a controlled metered flow using the melt pump.

2. The process of claim 1, wherein the plastic material is in the form of chips, pellets, and/or beads.

3. The process of claim 1, wherein the melting tank does not include an extruder.

4. The process of claim 1, wherein the control mechanism comprises a double-flap valve and/or a lock hopper.

5. The process of claim 1, wherein the temperature in the melting tank is from 200° C. to 250° C.

6. The process of claim 1, wherein the pressure of the melting tank is less than 1,034 kilopascal-gauge (150 psig).

7. The process of claim 1, wherein the gas mixture from the melting tank comprises at least one gas selected from the group consisting of nitrogen, a hydrocarbon gas, an acid gas, and combinations thereof.

8. The process of claim 7, wherein the gas mixture comprises the acid gas and wherein recirculating liquid comprises water that at least partially removes the acid gas from the gas mixture upon contact in the condenser.

9. The process of claim 7, wherein the gas mixture comprises the hydrocarbon gas and wherein the hydrocarbon gas is separated from the gas mixture and then at least partly recycled to the melting tank.

10. The process of claim 1, wherein the melt pump meters the feed of the molten plastic material to the processor.

11. The process of claim 1, wherein the melt pump maintains a liquid seal between the processor and the melting tank.

12. The process of claim 1, wherein the melt pump comprises a screw pump or a gear positive displacement pump.

13. The process of claim 1, wherein the plastic material does not contain a condensation polymer wherein the condensation polymer is polyethylene terephthalate, polyamide or polyurethane.

14. The process of claim 1, wherein the plastic material does not contain a compounded waste.

15. The process of claim 1, wherein the plastic material comprises at least one material selected from the group consisting of a polyolefin, a polyolefin blend, and combinations thereof.

16. The process of claim 1, wherein the melting tank agitator comprises a mechanical mixer, wherein the melting tank agitator is configured to mix the molten plastic material in the melting tank.

17. The process of claim 1, wherein heat to the melting tank is provided by heating coils within the melting tank.

18. The process of claim 1, wherein the plastic material is introduced through a lock hopper system that purges air from the plastic material before the plastic material is introduced to the melting tank.

19. The process of claim 1, wherein the processor is a pyrolysis reactor.

20. The process of claim 1, wherein the plastic material does not contain more than 10 percent polyethylene terephthalate, wherein the plastic material does not contain more than 10 percent polyamide, wherein the plastic material does not contain more than 10 percent PCT, wherein the plastic material does not contain more than 10 percent PVDC, wherein the plastic material does not contain more than 10 percent polyester, and wherein the plastic material does not contain more than 10 percent polyurethane.

21. The process of claim 1, wherein after adding a pyrolysis oil to the melting tank the molten plastic material has a viscosity of less than 20 MM centipoise.

22. The process of claim 1, comprising adding a pyrolysis oil to the mixing tank.

23. A process comprising:
    conveying a quantity of plastic material into a feed hopper via a screw conveyor or an air conveyor;
    supplying in a continuous manner a controlled amount of the plastic material into a melting tank from the feed hopper using a rotary valve control mechanism, wherein the rotary valve control mechanism forms a gas seal between the feed hopper and the melting tank, wherein the rotary valve provides a seal against a backflow of a gas from the melting tank, and wherein the rotary valve controls the quantity of the plastic material supplied into the melting tank;

melting the plastic material in the melting tank at a temperature from about 200° C. to about 300° C. while agitating the plastic material using a melting tank agitator to form a molten plastic material and a gas mixture, supplying the gas mixture to a condenser, wherein the gas mixture is contacted by a recirculated liquid in the condenser that strips out acid gases and other water-soluble gases, and wherein other gases not stripped out are compressed and at least partially sent back to the melting tank;

withdrawing the molten plastic material using a melt pump fluidically connected to the melt tank, wherein the molten plastic material has a melt viscosity in between 1000 cP and 20 MM cP; and supplying the molten plastic material into a processor in a controlled metered flow using the melt pump.

24. The process of claim 23, wherein the molten plastic material has a solid content of less than 30% wt/wt, wherein the solids are less than 4 cm.

* * * * *